US012809430B2

(12) United States Patent
Kulkarni et al.

(10) Patent No.: US 12,809,430 B2
(45) Date of Patent: Nov. 24, 2026

(54) PRIORITY BASED THERMAL MANAGEMENT FOR DATA STORAGE DEVICE ENCLOSURES

(71) Applicant: Western Digital Technologies, Inc., San Jose, CA (US)

(72) Inventors: Swarup Kulkarni, Bangalore (IN); Sarabjot Singh, Bangalore (IN); Pradeep Tiwari, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 538 days.

(21) Appl. No.: 18/232,642

(22) Filed: Aug. 10, 2023

(65) Prior Publication Data

US 2025/0004512 A1 Jan. 2, 2025

Related U.S. Application Data

(60) Provisional application No. 63/524,107, filed on Jun. 29, 2023.

(51) Int. Cl.
*G06F 1/20* (2006.01)
*G05B 19/4155* (2006.01)

(52) U.S. Cl.
CPC ........... *G06F 1/20* (2013.01); *G05B 19/4155* (2013.01); *G05B 2219/50333* (2013.01)

(58) Field of Classification Search
CPC .............................. G06F 1/20; G05B 19/4155
See application file for complete search history.

(56) References Cited

U.S. PATENT DOCUMENTS

| | | | | |
|---|---|---|---|---|
| 2013/0132769 | A1* | 5/2013 | Kulkarni | G06F 11/2094 714/6.22 |
| 2018/0279513 | A1* | 9/2018 | Tabuchi | G11B 33/142 |
| 2021/0397239 | A1* | 12/2021 | Sethi | G06F 1/3206 |
| 2022/0404882 | A1* | 12/2022 | Wanjale | G06F 1/206 |
| 2023/0345665 | A1* | 10/2023 | Tsuchida | H05K 7/20209 |

* cited by examiner

*Primary Examiner* — Mark A Connolly
(74) *Attorney, Agent, or Firm* — LOZA & LOZA, LLP; Gabriel Fitch

(57) ABSTRACT

Methods and apparatus for thermal management in data storage devices are provided. A data storage device includes one or more components, at least one component temperature sensor configured to detect one or more component temperatures, one or more fans configured to reduce the one or more component temperatures, and a processor. The processor is configured to determine a type of each respective component of the one or more components, set a priority of a respective component of the one or more components based on the type of the respective component, assign a fan speed offset for operating at least one fan of the one or more fans corresponding to the respective component based on the priority of the respective component, and operate the at least one fan corresponding to the respective component according to the assigned fan speed offset based on preselected conditions.

20 Claims, 8 Drawing Sheets

PRIORITY BASED THERMAL MANAGEMENT FOR DATA STORAGE DEVICE ENCLOSURES

CROSS REFERENCE TO RELATED APPLICATION

This application claims priority to and the benefit of U.S. Provisional Application Ser. No. 63/524,107, entitled "PRIORITY BASED THERMAL MANAGEMENT FOR DATA STORAGE DEVICE ENCLOSURES" and filed on Jun. 29, 2023, the entire content of which is incorporated herein by reference as if fully set forth below in its entirety and for all applicable purposes.

FIELD

The subject matter described herein relates to enclosures for data storage devices. More particularly, the subject matter relates, in some examples, to the thermal management of an enclosure based on a priority of components, including data storage devices, within the enclosure.

INTRODUCTION

As the storage capacities of data storage devices, such as solid-state devices (SSDs), continue to increase, e.g., from a gigabyte (GB) level to a terabyte (TB) level to a petabyte (PB) level, a single data storage device may struggle to withstand the demands of storing and/or handling a PB level of data. Accordingly, manufacturers of data storage devices have moved toward using JBOD (Just a Bunch of Disks) configurations, such as Serial Attached SCSI (Small Computer System Interface) (e.g., SAS)-based enclosures and Serial Advanced Technology Advancement (SATA)-based enclosures, as well as using JBOF (Just a Bunch of Flash) configurations, such as Flash-based enclosures, to store and/or handle large amounts of data. These enclosures may include a number of different hardware components, such as field programmable gate arrays (FPGA), a baseboard management controller (BMC), power supply units (PSUs), switches, expanders, and drives, which will all have different temperature threshold values for safe operation.

If the temperature of any component in such an enclosure is compromised (e.g., component temperature rises from a low temperature to a high temperature near a threshold value), fans present in the enclosure may be operated to reduce the component temperature. However, increasing a fan speed with a constant offset (or at a constant rate) above a default speed/rate or operating the fans at a fixed speed/rate (e.g., maximum speed/rate) may be problematic. For example, some hardware components may be vital to the performance of a system, and therefore, lowering the temperature of the vital components may need to be attended to immediately to prevent degradation of system performance. However, increasing the fan speed at a constant rate (e.g., fixed revolutions per minute (RPM) offset) may not be sufficient to lower the temperature of the vital components in a timely manner. In another example, hardware components (e.g., in an enclosure) may have different warning temperature values and critical temperature values. If one or more components have a current temperature that has a safe margin from their warning temperature value and/or critical temperature value, then a thermal management algorithm that increases the fan speed at a fixed rate (fixed RPM offset) for all components may lead to inefficiencies (e.g., unnecessary power consumption) since the algorithm increasing the fan speed at the fixed rate is unnecessary for some components that have not yet reached their warning temperature and/or critical temperature.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage device, including one or more components comprising at least one non-volatile memory (NVM), at least one component temperature sensor configured to detect one or more component temperatures of the one or more components, one or more fans configured to reduce the one or more component temperatures of the one or more components, and a processor coupled to the one or more components, the at least one component temperature sensor, and the one or more fans. The processor is configured to determine a type of each respective component of the one or more components, set a priority of a respective component of the one or more components based on the type of the respective component; assign a fan speed offset for operating at least one fan of the one or more fans corresponding to the respective component based on the priority of the respective component; and operate the at least one fan corresponding to the respective component according to the assigned fan speed offset based on preselected conditions.

One aspect of the disclosure provides a method for use with a data storage device including one or more components comprising at least one non-volatile memory (NVM). The method includes determining a type of each respective component of one or more components, setting a priority of a respective component of the one or more components based on the type of the respective component, assigning, based on the priority of the respective component, a fan speed offset for operating at least one fan of the data storage device corresponding to the respective component and configured to reduce a component temperature of the respective component, and operating the at least one fan corresponding to the respective component according to the assigned fan speed offset based on preselected conditions.

One aspect of the disclosure provides a data storage device, including one or more components, at least one component temperature sensor configured to detect one or more component temperatures of the one or more components, one or more fans configured to reduce the one or more component temperatures of the one or more components, and a processor coupled to the one or more components, the at least one component temperature sensor, and the one or more fans. The processor is configured to determine a current temperature of a first component of the one or more components, determine a priority of the first component using the at least one component temperature sensor, and operate at least one fan of the one or more fans corresponding to the first component based on at least one of the priority of the first component, a comparison between the current temperature of the first component and a warning temperature of the first component, or a comparison between the current temperature of the first component and a critical temperature of the first component.

One aspect of the disclosure provides a method for use with a data storage device including one or more components comprising at least one non-volatile memory (NVM). The method includes determining a current temperature of a first component of one or more components, determining a priority of the first component, and operating at least one fan of the data storage device corresponding to the first component and configured to reduce a component temperature of the first component based on at least one of the priority of the first component, a comparison between the current temperature of the first component and a warning temperature of the first component, or a comparison between the current temperature of the first component and a critical temperature of the first component.

One aspect of the disclosure provides a data storage device, including means for determining a type of each respective component of one or more components, the one or more components comprising at least one non-volatile memory (NVM), means for setting a priority of a respective component of the one or more components based on the type of the respective component, means for assigning, based on the priority of the respective component, a fan speed offset for operating at least one fan of the data storage device corresponding to the respective component and configured to reduce a component temperature of the respective component, and means for operating the at least one fan corresponding to the respective component according to the assigned fan speed offset based on preselected conditions.

Some aspects of the disclosure provide a data storage device enclosure and/or method for assigning a priority to each component in the data storage device enclosure based on the relative importance of the component and for storing the assigned priorities in a priority table to be referenced by firmware during thermal polling.

DETAILED DESCRIPTION

Figure 1:
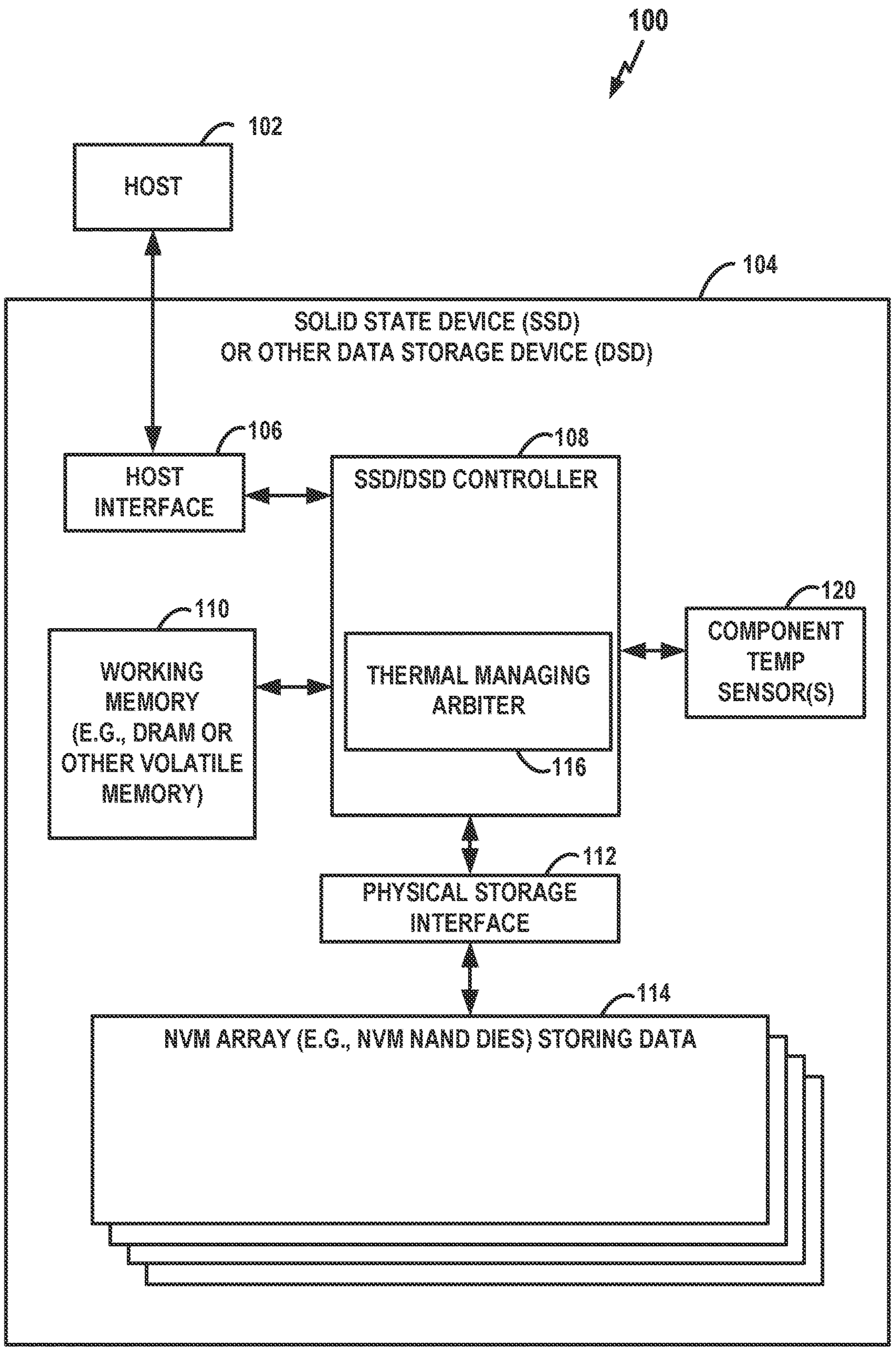
FIG. 1 is a schematic block diagram illustrating an exemplary data storage device (DSD) embodied as a solid-state device (SSD) including one or more component temperature sensors, and an SSD controller configured to control thermal management operations in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to enclosures for data storage devices (DSDs) and to thermal management of the enclosures based on assigned priorities to the enclosure components, including the DSDs. In the main examples described herein, data is stored within DSDs with non-volatile memory (NVM) arrays. In other examples, data may be stored in DSDs such as hard disk drives (HDDs) that store the data using magnetic recording techniques. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Typical techniques for thermal management of an enclosure (e.g., containing one or more DSDs) involve treating all components of the enclosure as vital components. A vital component may be defined as a component whose unavailability enables a system to continue to perform but with degraded performance. When the temperature of any component (regardless of whether the component is a vital component) in the enclosure has reached a critical temperature (temperature above which the component can be damaged if the component reaches a thermal state above such temperature), fan speeds may be increased accordingly. However, issues arise when increasing a fan speed with a constant/fixed offset (or at a constant/fixed rate) or operating the fans at a fixed speed/rate. For example, to prevent degradation of system performance, the temperature of a vital component may need to be lowered immediately. However, increasing the fan speed at a fixed rate may not be sufficient to lower the temperature of the vital component in a timely manner. In another example, the components of the enclosure have different warning temperatures (operating temperatures above which the component manufacturer has indicated that the respective component may no longer function as expected) and critical temperatures. Thus, if a selected component (of all of the components within a DSD enclosure) has a current temperature that has a safe margin from its warning temperature and/or critical temperature, then increasing the fan speed at a fixed rate for all components in the DSD enclosure may lead to inefficiencies, such as unnecessary power consumption, since increasing the fan speed at the fixed rate is unnecessary for the component that has not yet reached its warning temperature and/or critical temperature. Accordingly, improved techniques for thermal management of a DSD enclosure are needed.

Accordingly, the present disclosure is directed to a DSD enclosure with a thermal management system and a method that addresses the problems associated with increasing a fan speed with a constant offset or operating fans at a fixed speed. In an aspect, a priority (e.g., priority level) of each component in the DSD enclosure may be set, which enables fan speeds to be dynamically increased or decreased based on individual component need (component priority) by changing speed/rate offsets, and therefore, prevents degradation of system performance in a timely manner. In another aspect, power consumption may be optimized by dynamically adjusting a fan speed/rate offset based on a current temperature value of a component and how far or near the current temperature value is to the component's warning temperature value and/or to the critical temperature value.

Aspects of the disclosure relate to improved techniques for thermal management of a data storage device enclosure. In one aspect, internal components of a system are logically grouped by how critical the components are for the overall operation of the system/enclosure. When the temperature of a critical component approaches a temperature threshold/limit (e.g., warning temperature and/or critical temperature), system firmware (e.g., fan controller) may increase a fan speed in large increments (higher speed offsets/rates, e.g., relative to average speed offsets). When the temperature of a non-critical component approaches a temperature limit (e.g., warning temperature and/or critical temperature), the system firmware may increase the fan speed in small increments (lower speed offsets/rates, e.g., relative to average speed offsets) or does not increase the fan speed at all.

One particular aspect involves a data storage device such as an data storage device enclosure that includes one or more components comprising at least one non-volatile memory (NVM), at least one component temperature sensor configured to detect one or more component temperatures of the one or more components, one or more fans configured to reduce the one or more component temperatures of the one or more components, and a processor coupled to the one or more components, the at least one component temperature sensor, and the one or more fans. In such case, the processor is configured to determine a type of each respective component of the one or more components, set a priority of a respective component of the one or more components based on the type of the respective component; assign a fan speed offset for operating at least one fan of the one or more fans corresponding to the respective component based on the priority of the respective component; and operate the at least one fan corresponding to the respective component according to the assigned fan speed offset based on preselected conditions. In another particular aspect, the processor is configured to determine, via the at least one component temperature sensor, a current temperature of a first component of the one or more components, determine a priority of the first component, and operate at least one fan of the one or more fans corresponding to the first component based on at least one of the priority of the first component, a comparison between the current temperature of the first component and a warning temperature of the first component, or a comparison between the current temperature of the first component and a critical temperature of the first component.

Several advantages are provided by these improved techniques for thermal management. For example, by setting a priority (e.g., assigning a priority level) of each component in the enclosure, which enables fan speeds to be dynamically increased or decreased based on component need (component priority), the temperature of critical components may be lowered immediately to prevent degradation of system performance in a timely manner. In another example, by dynamically adjusting a fan speed/rate offset based on a current temperature of a component and how far or near the current temperature is to the component's warning temperature and/or critical temperature, system power consumption may be optimized (e.g., reduced).

Exemplary Devices, Systems and Procedures

FIG. 1 is a schematic block diagram illustrating an exemplary data storage system including a data storage device (DSD) embodied as a solid-state device (SSD) including one or more component temperature sensors, and an SSD controller configured to control thermal management operations in accordance with some aspects of the disclosure. The system 100 includes a host 102 and the SSD 104 (or other DSD, but for simplicity referred to as an SSD below) coupled to the host 102. The bost 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples. In an aspect, the SSD 104 may be one of a plurality of SSDs in a JBOD or JBOF enclosure configuration.

The SSD 104 includes a host interface 106, an SSD or DSD controller 108, a working memory 110 (such as DRAM or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the bost 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via physical storage (PS) interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110. In some embodiments, the controller 108 and/or the host interface 106 may be situated external to the SSD 104 and configured to manage data transfer to and from the NVM array 114 and/or the working memory 110 located within the SSD 104.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements. The SSD controller 108 includes a thermal managing arbiter 116, which can be configured to perform thermal management as will be described in further detail below. In one aspect, the thermal managing arbiter 116 can determine one or more component temperatures detected by one or more component temperature sensors 120. In one aspect, the thermal managing arbiter 116 is a module within the SSD controller 108 that is controlled by firmware. In one aspect, the thermal managing arbiter/controller 116 may be a separate component from the SSD controller 108 and may be implemented using any combination of hardware, software, and firmware (e.g., like the implementation options described above for SSD controller 108) that can perform thermal management as will be described in further detail below. In one example, the thermal managing arbiter 116 is implemented using a firmware algorithm or other set of instructions that can be performed on the SSD controller 108 to implement the thermal management functions described below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

In the example of FIG. 1, the controller 108 may include hardware, firmware, software, or any combinations thereof that provide the functionality for the thermal management arbiter 116.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform priority based thermal management and/or perform some or all of the other functions described herein.

Thermal Management of Enclosure

Figure 2:
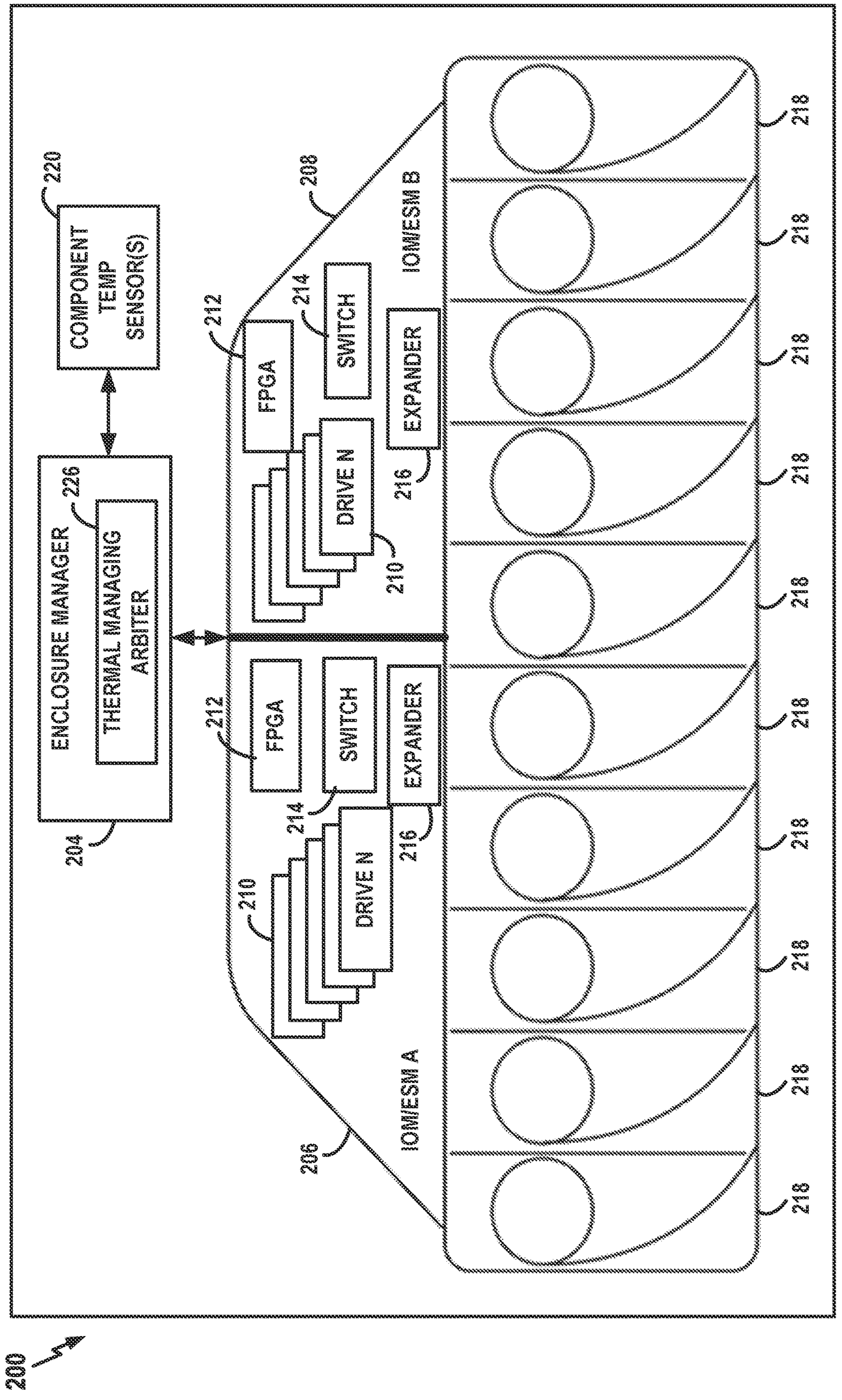
FIG. 2 is a block diagram illustrating an exemplary data storage device enclosure and sub-system configured to control thermal management operations of the enclosure in accordance with some aspects of the disclosure.

FIG. 2 is a block diagram illustrating an exemplary data storage device enclosure 200 with components configured to control thermal management operations of the enclosure in accordance with some aspects of the disclosure. The enclosure 200 includes an enclosure manager 204. The enclosure 200 may also contain various components including one or more of an input-output module (IOM)/enclosure services module (ESM). As shown in FIG. 2, the enclosure 200 includes a first TOM/ESM A 206 and a second IOM/ESM B 208. Each of the first IOM/ESM A 206 and the second IOM/ESM B 208 may include components, such as one or more drives 210 (e.g., SSDs 104 or disk drives using magnetic storage), i.e., N drives where N is an integer greater than or equal to 1 (N≥1), a field programmable gate array (FPGA) 212, a switch 214, and an expander 216. The FPGA 212 is a semiconductor device that is based on a matrix of configurable logic blocks (CLBs) connected via programmable interconnects. For the enclosure 200, the FPGA 212 may handle operations involving V/O module reset, light emitting diodes (LEDs), and/or drive interconnects, for example. The switch 214 (e.g., peripheral component interconnect express (PCIe) switch) is a device that expands the number of PCIe lanes available from a host device such that more devices can be supported by the host device. The switch 214 may be located between the host device and the drives (e.g., NVMe drives). The expander 216 is a device that facilitates device expansion or the connection of more drives. For example, an SAS expander enables a server to connect a large number of drives. The enclosure 200 may include a single expander or multiple expanders. The enclosure 200 also includes one or more fans 218 configured to lower the temperatures of components within the enclosure 200. The one or more fans 218 may be enclosure fans (fans dedicated to lowering the temperature of the entire enclosure), individual component fans (fans dedicated to lowering the temperature of a specific component), or group fans (fans dedicated to lowering the temperature of a group of selected components).

The enclosure manager 204 is configured to control operations of the enclosure 200. The enclosure manager 204 may be located internal or external to the enclosure 200. Moreover, the enclosure manager 204 may include any type of processing device, such as a microprocessor, a microcontroller, an embedded controller, a logic circuit, software, firmware, or the like, for controlling operation of the enclosure 200. In some aspects, the enclosure manager 204 may be the controller 108 of FIG. 1. In other aspects, the enclosure manager 204 may be a baseboard management controller (BMC), which is a specialized service processor that monitors the physical state of a computer, network server, or other hardware device using sensors and communicates with a system administrator through an independent connection. In various aspects, the enclosure manager 204 receives commands from a host (e.g., host 102) and routes the commands to the one or more drives 210, to facilitate transfer of data between the host and the one or more drives 210.

The enclosure manager 204 may include a thermal managing arbiter 226 (e.g., thermal managing arbiter 116), which can be configured to perform thermal management as will be described in further detail below. In one aspect, the enclosure manager 204 (via the thermal managing arbiter 226) can determine a temperature of one or more components of the enclosure 200 detected by one or more component temperature sensors 220 (e.g., sensors 120), shown here in a single location for simplicity but actually disposed in different locations to measure the associated component temperatures. The one or more component temperature sensors 220 may be located internal or external to the enclosure 200. In one aspect, the thermal managing arbiter 226 is a module within the enclosure manager 204 that is controlled by firmware running a thermal management algorithm. In one aspect, the thermal managing arbiter 226 may be a separate component from the enclosure manager 204 and may be implemented using any combination of hardware, software, and firmware that can perform thermal management as will be described in further detail below. In one example, the thermal managing arbiter 226 is implemented using a firmware algorithm or other set of instructions that can be performed on the enclosure 200 to implement the thermal management functions described below. In one aspect, the enclosure manager 204 may include hardware, firmware, software, or any combinations thereof that provide the functionality for the thermal management arbiter 226.

Aspects of the disclosure relate to managing temperatures of the enclosure 200 to prevent enclosure components from reaching a non-working threshold temperature (operating temperature above which a component may no longer function as expected). The fatal temperature may be a temperature at which a component reaches a warning stage above which there may be a performance impact. The components may be prioritized based on type (e.g., component type), and therefore, different thermal management operations may be enabled based on component priority. For example, the different types of enclosure components may include single point failure components, vital components, field replaceable units (FRUs), and customer replaceable units (CRUs). A single point failure component is a singular component present in the enclosure that performs a unique function. Hence, if the single point failure component fails to operate, there is no backup component in the enclosure to perform the component's unique functionality. A vital component is a component present in the enclosure that is vulnerable to temperature change and can degrade the performance of a system if it fails to operate. An inoperability (or unavailability) of a vital component still enables the system to function but with reduced performance. An FRU is a component, such as a printed circuit board, part, or assembly that can be easily removed from a computer or other piece of electronic equipment, and replaced by a user or technician without having to send an entire product or system to a repair facility. The FRU may require original equipment manufacturer (OEM) service personnel or an OEM authorized warranty service provider to perform the replacement. A CRU is a component that can be replaced by an end user without the assistance of on-site OEM service personnel. Temperature thresholds such as the warning temperature and the critical temperature for DSD enclosure components may be obtained from the manufacturers of those respective components and/or empirical testing.

The inoperability of a vital component in an enclosure may lead to a system's reduced performance. Therefore, safeguards may be implemented to prevent the vital component from reaching a non-working threshold temperature. Referring to FIG. 2, a component such as an expander 216 may be a vital component. Accordingly, when the temperature of one or more expanders 216 rises above a nominal temperature, although an entire system (enclosure) will not be rendered inoperable, the performance of the enclosure will be reduced (e.g., reduced by as much as 50% capacity). Thus, immediately lowering the temperature of the one or more expanders 216 to be below a warning temperature is preferred. For example, a fan speed of the one or more fans 218 may be increased to cool the temperature of the one or more expanders 216, and consequently, prevent system performance degradation. However, the previous thermal management technique of increasing the fan speed at a minimal fixed offset from a default speed/rate (e.g., default RPM) may not be sufficient to lower the temperature of the one or more expanders 216 in a timely manner. Thus, the system would benefit if the fan speed for vital components such as the one or more expanders 216 could be increased at a rate higher than the minimal fixed offset.

If a single point failure component in the enclosure reaches a fatal temperature (warning temperature), the component may power itself off as part of a self-preservation process. Consequently, if the single point failure component is powered off, then the entire system (enclosure) may be rendered inoperable. As such, an algorithm for managing component temperatures using prioritization may be used to ensure that the single point failure component remains within a working environment whenever the temperature of the component rises above a warning temperature. Referring to FIG. 2, a component such as an FPGA 212 may be a single point failure component. One or more FPGAs 212 may service one or more drives 210. Accordingly, when the temperature of the one or more FPGAs 212 rises above the warning temperature, the one or more FPGAs 212 power off and render the one or more drives 210 being serviced by the one or more powered-off FPGAs inaccessible leading to data loss. Immediately lowering the temperature of the one or more FPGAs 212 below the warning temperature is thus preferred to prevent FPGA shut down and subsequent data loss, however, the previous thermal management technique of increasing a fan speed at a minimal fixed offset from a default speed/rate (e.g., default RPM) may not be sufficient to lower the temperature in a timely manner. Hence, the system would benefit if the fan speed for single point failure components such as the one or more FPGAs 212 could be increased to a maximum supported rate (e.g., immediately increased at a maximum supported offset) to reduce component temperatures to nominal values.

To address the problems described above, an aspect of the disclosure is directed to a thermal management algorithm for managing component temperatures within an enclosure. The thermal management algorithm may be run by firmware configured to control an enclosure manager (e.g., enclosure manager 226 including thermal managing arbiter 226). In an aspect, the thermal management algorithm may set a priority (e.g., assign a priority level) of each component in the enclosure in ascending order according to type, and also assign a speed offset for increasing a fan speed for the respective component corresponding to the set priority.

For example, the thermal management algorithm may set a priority of single point failure components to a highest priority (e.g., priority 0) and correspondingly assign a speed offset for increasing a fan speed for the single point failure components to a maximum speed offset (e.g., 5% from a default speed (default RPM), where the maximum offset may be a function of the type of fan being controlled). Vital components may cause system instability and/or degrade system performance when thermally compromised (thermal state rising above warning temperature). As such, the thermal management algorithm may set a priority (e.g., priority level) of the vital components to a next highest priority (e.g., priority 1) and correspondingly assign a speed offset for increasing a fan speed for the vital components to a next highest speed offset (e.g., 3% from a default speed). Other components, such as FRUs and CRUs, may be prone to failures and may not affect system performance. For example, FRUs and CRUs are the type of devices that a field engineer or user can easily replace when the devices experience a thermal compromise and will not affect the ability of other enclosure components to work properly when the devices are inoperable. In contrast, the inoperability of other devices such as expanders or FPGAs will affect the ability of other enclosure components to work properly. For example, an inoperability of the expanders or FPGAs will negatively affect component communications since these devices may act as a medium for data exchange between components. Accordingly, the thermal management algorithm may set a priority of the other components (FRUs and CRUs) to a lowest priority (e.g., priority 2) and correspondingly assign a speed offset for increasing a fan speed for the other components to a lowest speed offset (e.g., 2% from a default speed, where the lowest speed offset may be a function of the type of fan being controlled).

A priority table including all of the set priorities and assigned fan speed offsets may be stored in the enclosure manager or other storage (e.g., BMC) by firmware. The thermal management algorithm may refer to the priority table during thermal scans of the enclosure and can dynamically change the priorities and speed offsets when needed. When the thermal management algorithm detects a particular enclosure component to have a temperature above a warning temperature, the algorithm may read the priority table and operate a fan for the detected component at an increased fan speed according to the priority of the component and the corresponding speed offset.

An example priority table is shown in Table 1 below:

TABLE 1

| Component Name | Priority | Speed Offset Percent |
|---|---|---|
| FPGA (Single Point Failure) | 0 | 5 |
| SSD (CRU) | 2 | 2 |
| IOM (Vital) | 1 | 3 |

As an example, Table 1 includes set priorities and fan speed offsets for a single point failure component (FPGA), a CRU (SSD or drive), and a vital component (IOM). As stated above, the thermal management algorithm may refer to the priority table during thermal scans of the enclosure. Accordingly, when the thermal management algorithm detects an FPGA to have a temperature above a warning temperature, the algorithm may read the priority table and determine that the FPGA has a highest priority (priority 0) and consequently operate (via the enclosure manager) a fan for the FPGA at a highest fan speed offset (5% from a default fan speed) corresponding to the priority 0. When the thermal management algorithm detects an SSD to have a temperature above a warning temperature, the algorithm may read the priority table and determine that the SSD has a lowest priority (priority 2) and consequently operate (via the enclosure manager) a fan for the SSD at a lowest fan speed offset (2% from a default fan speed) corresponding to the priority 1. When the thermal management algorithm detects an IOM to have a temperature above a warning temperature, the algorithm may read the priority table and determine that the IOM has a second highest priority (priority 1) and consequently operate (via the enclosure manager) a fan for the IOM at a fan speed offset (3% from a default fan speed) corresponding to the priority 1.

Figure 3:
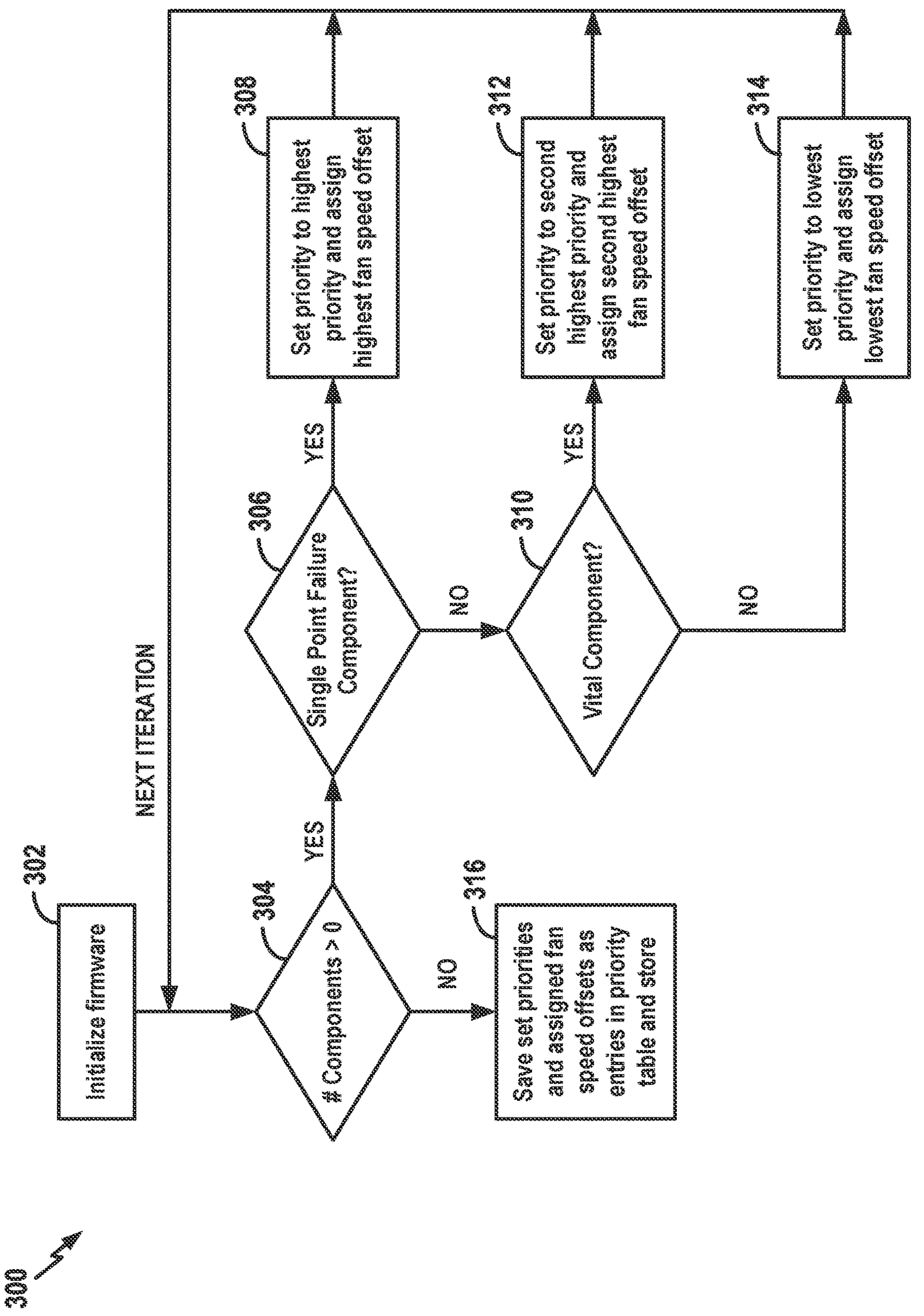
FIG. 3 is a flowchart illustrating a thermal management process for setting a priority of, and assigning a fan speed offset to, components within a data storage device enclosure in accordance with some aspects of the disclosure.

FIG. 3 is a flowchart illustrating a thermal management process 300 for setting a priority of, and assigning a fan speed offset to, components within an enclosure in accordance with some aspects of the disclosure. The process 300 may be performed by firmware running in the enclosure manager 204 (or thermal managing arbiter 226) of FIG. 2, or the SSD/DSD controller 108 (or thermal managing arbiter 116) of FIG. 1, or any other suitably equipped device controller.

At block 302, the process initializes the firmware after the enclosure is powered on. Upon initialization, the process is ready to begin an iterative procedure to set priorities of the components within the enclosure as well as assign respective fan speed offsets for increasing a fan speed for the components based on the set priorities.

At block 304, the process determines if there exist any components (e.g., in the enclosure) for which a priority may be set (and/or fan speed offset may be assigned). If the number of components for which a priority may be set is greater than 0 (#components >0), then the process proceeds to block 306.

At block 306, the process considers a component and determines whether the component is a single point failure component. If the process determines that the component is a single point failure component (e.g., FPGA), then the process proceeds to block 308. At block 308, the process sets a priority of the component to a highest priority (e.g., priority 0) and correspondingly assigns a speed offset for increasing a fan speed for the single point failure component to a highest supported (maximum) fan speed offset (e.g., 5% from a default speed (default RPM)). If the process determines that the component is not a single point failure component, then the process proceeds to block 310.

At block 310, the process determines whether the component is a vital component. If the process determines that the component is a vital component (e.g., IOM), then the process proceeds to block 312. At block 312, the process sets a priority of the component to a next highest priority (e.g., priority 1) and correspondingly assigns a speed offset for increasing a fan speed for the vital component to a next highest supported fan speed offset (e.g., 3% from a default speed). If the process determines that the component is not a vital component, then the process proceeds to block 314.

At block 314, the process determines (by default) that the component may be a component that does not greatly affect system performance (e.g., FRU and CRU). Accordingly, the process sets a priority of the component to a lowest priority (e.g., priority 2) and correspondingly assigns a speed offset for increasing a fan speed for the component to a lowest supported (default) fan speed offset (e.g., 2% from a default speed).

Upon completing the operation at block 308, block 312, or block 314, the process proceeds back to block 304 to perform the process again for the next component (in the enclosure). At block 304, if there no longer exists any components for which a priority may be set (and/or fan speed offset may be assigned), then the process proceeds to block 316. At block 316, the process may save the set priorities and assigned fan speed offsets of the components as entries in a priority table. The process may further store the priority table in the enclosure manager 204 or other storage (e.g., controller 108. BMC, one of the storage drives, etc.). In an aspect, the process may dynamically overwrite the set priorities and/or assigned fan speed offsets during the course of enclosure operations.

Aspects of the disclosure also relate to techniques for managing temperatures of the enclosure 200 to prevent enclosure components from reaching a non-working threshold temperature that prevents unnecessary power consumption. Enclosure components have different warning temperatures and critical temperatures. If a component has a current temperature that has just entered a warning temperature range but is still a safe margin from a critical temperature range, then the previous thermal management technique of increasing a fan speed at a fixed speed offset for the component may be inefficient (e.g., consume more power than necessary). That is, it may be sufficient to reduce the component temperature with a lower speed offset since the component's current temperature may be just above a lowest warning temperature of the warning temperature range and at a non-threatening distance away from the critical temperature range.

As an example, an enclosure component (e.g., drive) may have a working temperature between 20° C. and 50° C. (Working Temp=20° C. to 50° C.), a warning (fatal) temperature between 51° C. and 60° C. (Warning Temp=51° C. to 60° C.), and a critical temperature between 61° C. and 70° C. (Critical Temp=61° C. to 70° C.). According to the previous thermal management technique, if the current temperature of the component reaches 52° C., then a thermal management process will determine that the component is in a warning temperature range and raise a fan speed with a fixed speed offset. However, doing so may consume more power than necessary since it may be sufficient to reduce the component temperature with a lower speed offset since the component's current temperature (52° C.) is only just above a lowest warning temperature (51° C.) of a warning temperature range (51° C. to 60° C.) and a safe margin away from a critical temperature range (61° C. to 70° C.). Thus, the enclosure would benefit (via reduced power consumption) if the fan speed for a component that has just entered the warning temperature range and/or is a safe margin away from the critical temperature range could be operated at a lower speed (e.g., minimum supported speed), or increased by a lower speed offset (e.g., lowest supported speed offset), rather than the fixed speed offset.

To address the problems described above, an aspect of the disclosure is directed to a thermal management algorithm for managing component temperatures within an enclosure that facilitates lower power consumption. The thermal management algorithm may be run by firmware configured to control an enclosure manager (e.g., enclosure manager 226 including thermal managing arbiter 226). In an aspect, the thermal management algorithm may manage component temperatures based on a state of a component's current temperature with respect to the component's warning temperature and/or critical temperature. Moreover, the thermal management algorithm may poll each component in the enclosure to determine a respective component's current temperature (CURR TEMP).

In an example, if a component has a CURR TEMP above a warning temperature (WARN TEMP) and less than a critical temperature (CRIT TEMP), then the thermal management algorithm may increase the fan speed for the component by a lowest supported speed offset (e.g., 2% from a default speed/rate) if the following equation is satisfied: |WARN TEMP−CURR TEMP|≤X, where X is a lower tolerance value set by the algorithm between the CURR TEMP and the WARN TEMP. For example, X may be set to a value of 2 (X=2). Accordingly, if the current temperature of the component is 61° C. (CURR TEMP=61° C.) and the WARN TEMP of the component is 60° C. (WARN TEMP=60° C.), then |WARN TEMP−CURR TEMP|=|60° C.-61° C.|=1, which is less than X=2. As such, the thermal management algorithm may increase the fan speed for the component by the lowest supported speed offset.

In another example, if a component has a CURR TEMP above a WARN TEMP and less than a CRIT TEMP, then the thermal management algorithm may increase the fan speed for the component by a lowest supported speed offset (e.g., 2% from a default speed/rate) if the following equation is satisfied: |CRIT TEMP−CURR TEMP|≥Y, where Y is a lower tolerance value set by the algorithm between the CURR TEMP and the CRIT TEMP. For example, Y may be set to a value of 6 (Y=6). Accordingly, if the current temperature of the component is 63° C. (CURR TEMP=63° C.) and the CRIT TEMP of the component is 70° C. (CRIT TEMP=70° C.), then |CRIT TEMP−CURR TEMP|=170° C.-63° C.|=7, which is greater than Y=6. As such, the thermal management algorithm may increase the fan speed for the component by the lowest supported speed offset.

In a further example, if a component has a CURR TEMP above a WARN TEMP but not less than a CRIT TEMP, then the thermal management algorithm may increase the fan speed for the component according to a priority table determined by the algorithm (see, for example. Table 1 above). For example, if the current temperature of the component is 70° C. (CURR TEMP=70° C.), the WARN TEMP of the component is 60° C. (WARN TEMP=60° C.) and the CRIT TEMP of the component is 70° C. (CRIT TEMP=70° C.), then the component has a CURR TEMP above the WARN TEMP but not less than the CRIT TEMP. Accordingly, the thermal management algorithm may increase the fan speed for the component according to the priority table.

Figure 4:
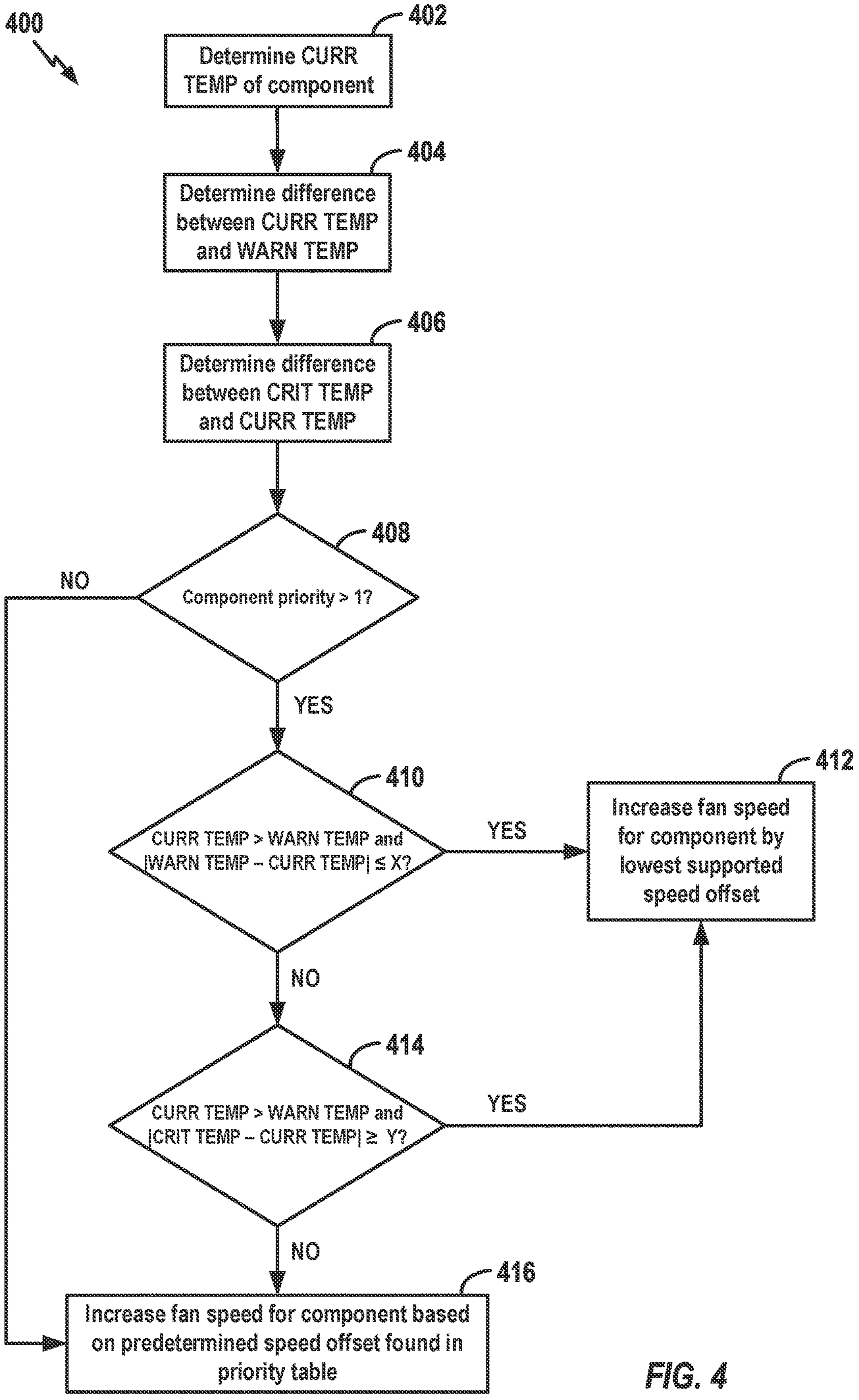
FIG. 4 is a flowchart illustrating a thermal management process for managing component temperatures within a data storage device enclosure that facilitates lower power consumption in accordance with some aspects of the disclosure.

FIG. 4 is a flowchart illustrating a thermal management process 400 for managing component temperatures within an enclosure that facilitates lower power consumption in accordance with some aspects of the disclosure. The process 400 may be performed by firmware running in the enclosure manager 204 (or thermal managing arbiter 226) of FIG. 2, or the SSD/DSD controller 108 (or thermal managing arbiter 116) of FIG. 1, or any other suitably equipped device controller.

At block 402, the process determines a current temperature (CURR TEMP) of a component. For example, the process may poll each component in the enclosure to determine a respective component's current temperature. At block 404, the process may determine a difference between the component's current temperature and the component's warning temperature (WARN TEMP). At block 406, the process may also determine a difference between the component's critical temperature (CRIT TEMP) and the component's current temperature.

At block 408, the process determines whether a priority of the component is greater than 1. For example, single point failure components may have a highest priority or priority 0, vital components may have a next highest priority or priority 1, and other components, such as FRUs and CRUs, may have a lowest priority or priority 2. Accordingly, if the component is a single point failure component or a vital component, then the process determines that the priority of the component is 0 or 1, which is not greater than 1. As such, the process may proceed to block 416. At block 416, the process increases the fan speed for the component according to a predetermined fan speed offset based on the component priority. For example, the process may read a previously generated priority table (see Table 1 above) that includes a previously set priority and assigned fan speed offset for the component, and apply the assigned fan speed offset accordingly.

If the component is an FRU or CRU, then the process at block 408 determines that the priority of the component is 2, which is greater than 1. As such, the process may proceed to block 410. At block 410, the process determines if the CURR TEMP is greater than the WARN TEMP. If so, the process determines if an absolute value of the difference between the CURR TEMP and the WARN TEMP is less than or equal to X (|WARN TEMP−CURR TEMP|≤X), where X is a lower tolerance value set by the process between the CURR TEMP and the WARN TEMP (e.g., X=2). If the absolute value of the difference between the CURR TEMP and the WARN TEMP is less than or equal to X, then the process proceeds to block 412. At block 412, the process increases the fan speed for the component according to a lowest supported fan speed offset.

If the absolute value of the difference between the CURR TEMP and the WARN TEMP is not less than or equal to X, then the process may proceed to block 414. At block 414, if the CURR TEMP is greater than the WARN TEMP, then the process determines if an absolute value of the difference between the CRIT TEMP and the CURR TEMP is greater than or equal to Y (|CRIT TEMP−CURR TEMP|>Y), where Y is a lower tolerance value set by the process between the CURR TEMP and the CRIT TEMP (e.g., Y=6). If the absolute value of the difference between the CURR TEMP and the CRIT TEMP is greater than or equal to Y, then the process proceeds to block 412. At block 412, the process increases the fan speed for the component according to a lowest supported fan speed offset.

Figure 5:
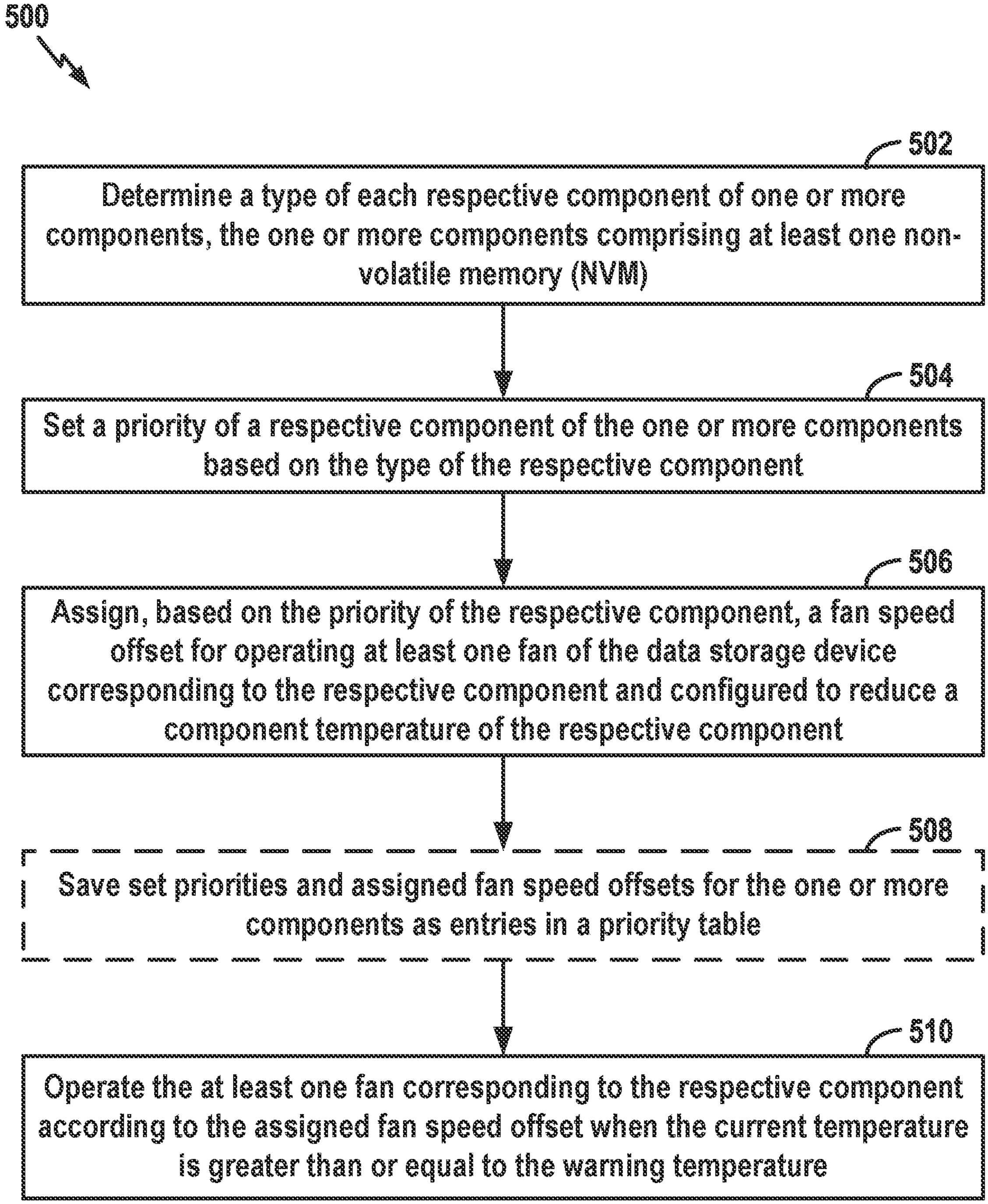
FIG. 5 is a flowchart illustrating another thermal management process for setting a priority of, and assigning a fan speed offset to, components within a data storage device enclosure in accordance with some aspects of the disclosure.

FIG. 5 is a flowchart illustrating a thermal management process 500 for setting a priority of, and assigning a fan speed offset to, components within an enclosure in accordance with some aspects of the disclosure. The process 500 may be for use with a data storage device (e.g., enclosure 200) including one or more components. In an aspect, the one or more components includes a plurality of solid state devices (SSDs). In another aspect, the one or more components further includes at least one of a non-volatile memory (NVM), a data storage device (DSD) controller, an input-output module (IOM), an enclosure services module (ESM), a field programmable gate array (FPGA), a baseboard management controller (BMC), a power supply units (PSU), a switch, or an expander. The process 500 may be performed by firmware running in the enclosure manager 204 (or thermal managing arbiter 226) of FIG. 2, or the SSD/DSD controller 108 (or thermal managing arbiter 116) of FIG. 1, or any other suitably equipped device controller.

At block 502, the process determines a type of each respective component of one or more components, the one or more components including at least one non-volatile memory (NVM). For example, determining the type of each respective component of the one or more components may include determining whether the respective component is a single point failure component (e.g., FPGA) or a vital component (e.g., IOM).

At block 504, the process sets a priority of a respective component of the one or more components based on the type of the respective component. For example, the process may set the priority of the respective component to a highest priority (e.g., priority 0)) responsive to a determination that the respective component is the single point failure component, set the priority of the respective component to a next highest priority (e.g., priority 1) responsive to a determination that the respective component is the vital component, and set the priority of the respective component to a lowest priority (e.g., priority 2) responsive to a determination that the respective component is not the single point failure component or the vital component (e.g., FRU or CRU).

In one aspect, the priority of the one or more components is set such that a priority of a DSD controller is higher than a priority of one of the SSDs, and the priority of the one SSD is higher than a priority of the IOM. In another aspect, a priority of a first type of component of the one or more components is set based on a count of a number of first type components in the data storage device.

At block 506, the process assigns, based on the priority of the respective component, a fan speed offset for operating at least one fan of the data storage device corresponding to the respective component and configured to reduce a component temperature of the respective component. For example, the process may assign a highest fan speed offset (e.g., 5% from a default speed (default RPM)) for operating the at least one fan corresponding to the respective component based on the respective component having the highest priority (e.g., priority 0). The process may also assign a next highest fan speed offset (e.g., 3% from the default speed), as compared to the highest fan speed offset, for operating the at least one fan corresponding to the respective component based on the respective component having the next highest priority (e.g., priority 1) as compared to the highest priority. The process may further assign a lowest fan speed offset (e.g., 2% from the default speed) for operating the at least one fan corresponding to the respective component based on the respective component having the lowest priority (e.g., priority 2).

At optional block 508, the process saves set priorities and assigned fan speed offsets for the one or more components as entries in a priority table (e.g., Table 1). At block 510, the process operates the at least one fan corresponding to the respective component according to the assigned fan speed offset based on preselected conditions. For example, the process determines whether a current temperature of the respective component is greater than or equal to a warning temperature of the respective component and operates the at least one fan corresponding to the respective component according to the assigned fan speed offset responsive to a determination that the current temperature is greater than or equal the warning temperature.

Figure 6:
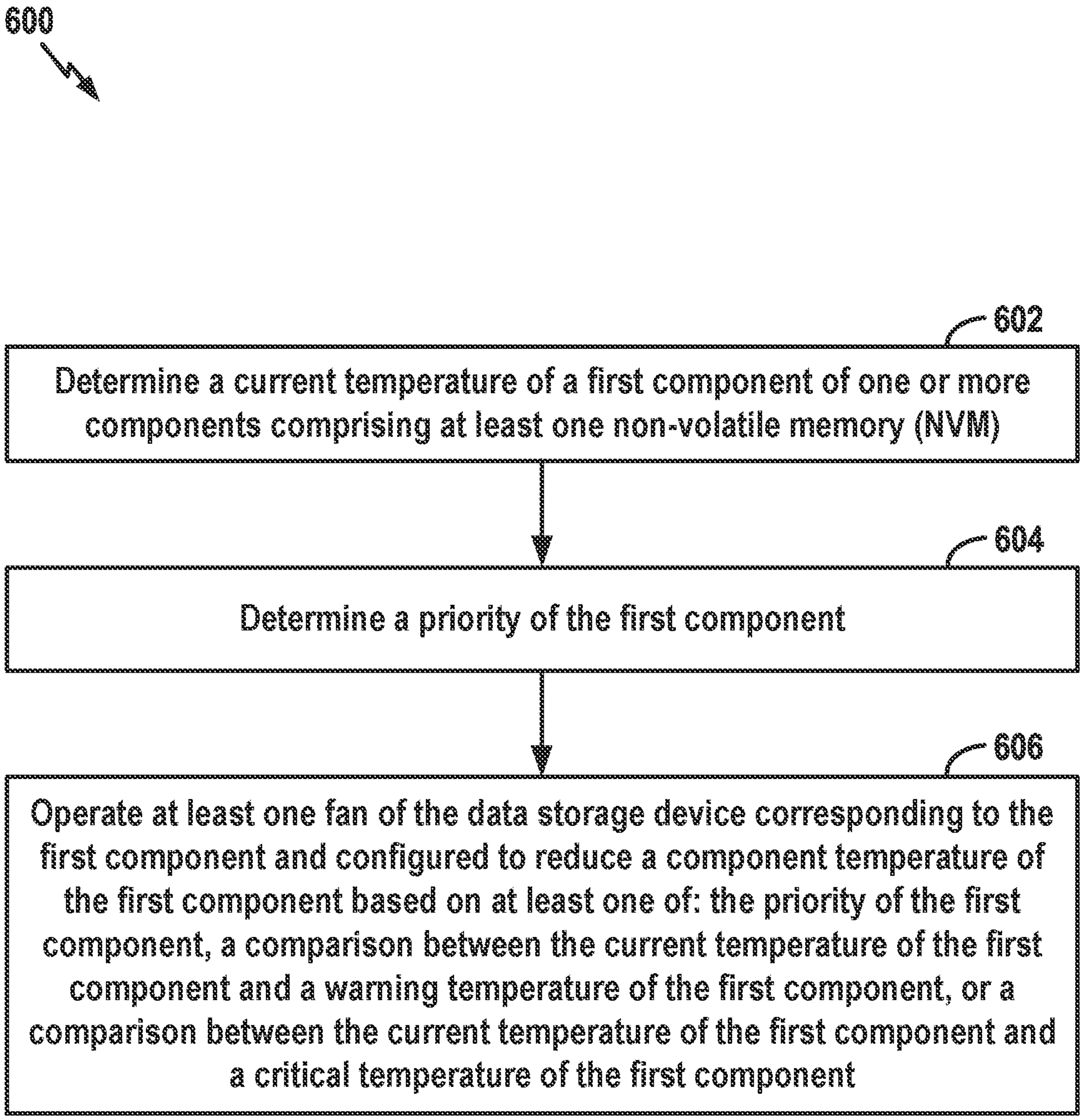
FIG. 6 is a flowchart illustrating another thermal management process for managing component temperatures within a data storage device enclosure that facilitates lower power consumption in accordance with some aspects of the disclosure.

FIG. 6 is a flowchart illustrating a thermal management process 600 for managing component temperatures within an enclosure that facilitates lower power consumption in accordance with some aspects of the disclosure. The process 600 may be for use with a data storage device (e.g., enclosure 200) including one or more components. In an aspect, the one or more components includes a plurality of solid state devices (SSDs). In another aspect, the one or more components further includes at least one of a non-volatile memory (NVM), a data storage device (DSD) controller, an input-output module (IOM), an enclosure services module (ESM), a field programmable gate array (FPGA), a baseboard management controller (BMC), a power supply units (PSU), a switch, or an expander. The process 500 may be performed by firmware running in the enclosure manager 204 (or thermal managing arbiter 226) of FIG. 2, or the SSD/DSD controller 108 (or thermal managing arbiter 116) of FIG. 1, or any other suitably equipped device controller.

At block 602, the process determines (e.g., via component temperature senso 220) a current temperature of a first component of one or more components including at least one non-volatile memory (NVM).

At block 604, the process determines a priority of the first component. The first component may have previously been set with a priority based on a type of the first component. For example, if the first component is a single point failure component, then the first component may have previously been set with a highest priority (e.g., priority 0). If the first component is a vital component, then the first component may have been previously set with a next highest priority (e.g., priority 1) as compared to the highest priority. If the first component is another type of component, such as an FRU or CRU, then the first component may have previously been set with a lowest priority (e.g., priority 2).

At block 606, the process operates at least one fan of the data storage device corresponding to the first component and configured to reduce a component temperature of the first component. The process operates the at least one fan based on at least one of the priority of the first component, a comparison between the current temperature of the first component and a warning temperature of the first component, or a comparison between the current temperature of the first component and a critical temperature of the first component.

In one aspect, the process operates the at least one fan by increasing a fan speed of the at least one fan according to a predetermined fan speed offset corresponding to the priority of the first component responsive to a determination that the priority is less than or equal to 1. For example, the predetermined fan speed offset may be read from a previously generated priority table (e.g., Table 1) that includes a previously set priority and assigned fan speed offset for the first component.

In one aspect, responsive to a determination that the priority is greater than 1, the process operates the at least one fan by determining whether the current temperature of the first component is greater than the warning temperature of the first component, determining an absolute value of a difference between the current temperature and the warning temperature (|WARN TEMP−CURR TEMP|) responsive to a determination that the current temperature is greater than the warning temperature (CURR TEMP>WARN TEMP), and increasing a fan speed of the at least one fan according to a lowest fan speed offset (e.g., 2% from a default speed/rate) responsive to a determination that the absolute value of the difference between the current temperature and the warning temperature is less than or equal to a first preselected tolerance value. For example, the first preselected tolerance value may be represented by X such that |WARN TEMP−CURR TEMP|≤X, where X is an integer representing a lower tolerance value set between the current temperature and the warning temperature.

In one aspect, responsive to a determination that the priority is greater than 1, the process operates the at least one fan by determining whether the current temperature of the first component is greater than the warning temperature of the first component, determining an absolute value of a difference between the current temperature and the critical temperature (|CRIT TEMP−CURR TEMP|) responsive to a determination that the current temperature is greater than the warning temperature (CURR TEMP>WARN TEMP), and increasing the fan speed of the at least one fan according to a lowest fan speed offset (e.g., 2% from a default speed/rate) responsive to a determination that the absolute value of the difference between the current temperature and the critical temperature is greater than or equal to a second preselected tolerance value. For example, the second preselected tolerance value may be presented by Y such that |CRIT TEMP−CURR TEMP|>Y, where Y is an integer representing a lower tolerance value set between the current temperature and the critical temperature.

In one aspect, responsive to a determination that the priority is greater than 1, the process operates the at least one fan by increasing the fan speed of the at least one fan according to a predetermined fan speed offset corresponding to the priority of the first component responsive to a determination that the current temperature is greater than the warning temperature, the absolute value of the difference between the current temperature and the warning temperature is not less than or equal to the first preselected tolerance value, and the absolute value of the difference between the current temperature and the critical temperature is not greater than or equal to the second preselected tolerance value.

Additional Exemplary Apparatus

Figure 7:
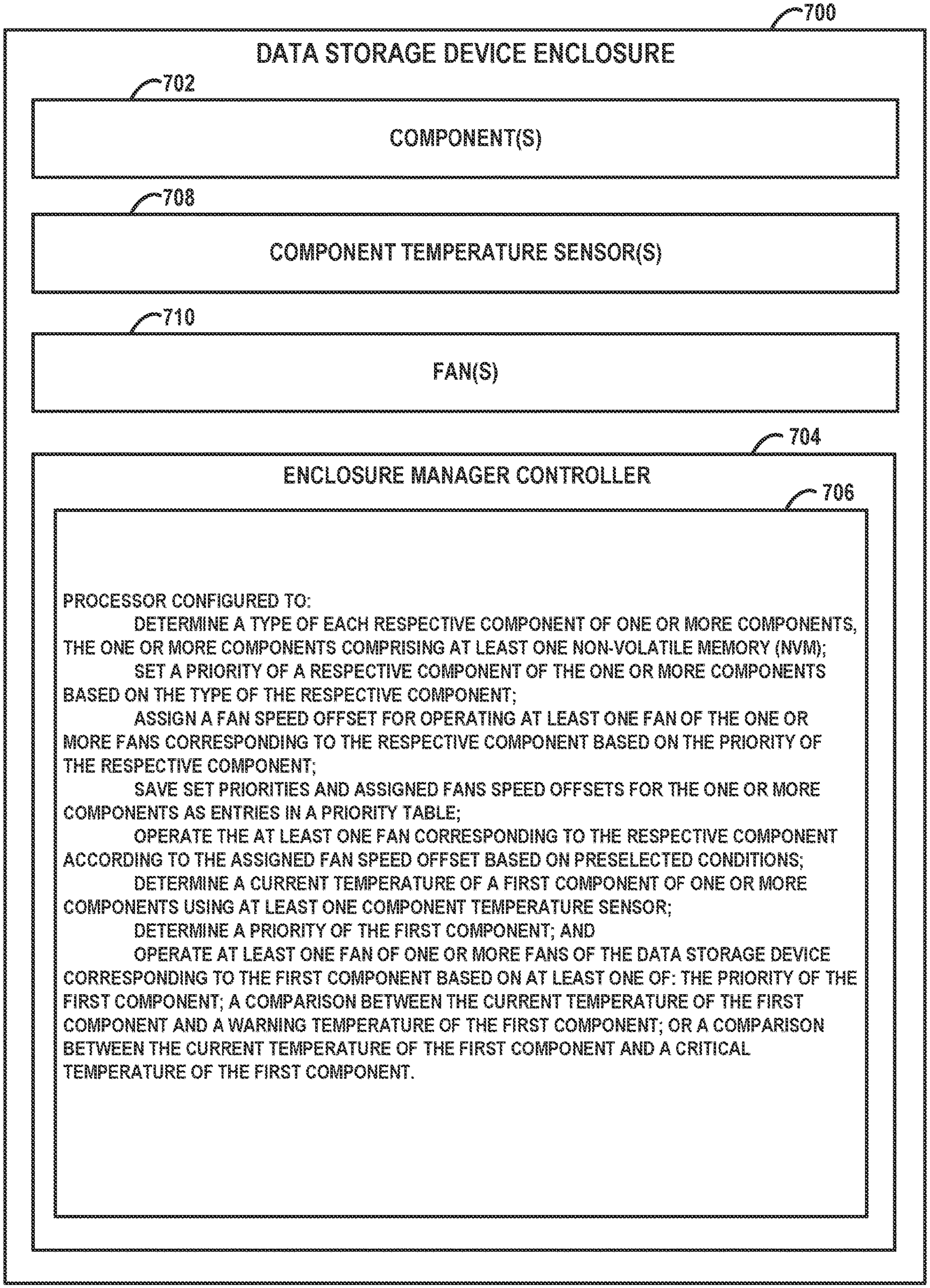
FIG. 7 is a schematic block diagram illustrating an exemplary data storage device enclosure configured in accordance with some aspects of the disclosure.

FIG. 7 broadly illustrates a data storage device enclosure 700 configured according to one or more aspects of the disclosure. The data storage device enclosure 700 includes one or more components 702 (including at least one non-volatile memory (NVM)), one or more component temperature sensors 708, one or more fans 710, and an enclosure manager controller 704. The enclosure manager controller 704 includes a processor or processing circuit 706 configured to: determine a type of each respective component of the one or more components 702; set a priority of a respective component of the one or more components based on the type of the respective component; assign a fan speed offset for operating at least one fan of the one or more fans 710 corresponding to the respective component based on the priority of the respective component; save set priorities and assigned fans speed offsets for the one or more components 710 as entries in a priority table; and operate the at least one fan of the one or more fans 710 corresponding to the respective component according to the assigned fan speed offset based on preselected conditions.

In one aspect, to operate the at least one fan, the processor 706 may determine whether a current temperature of the respective component is greater than or equal to a warning temperature of the respective component and operate the at least one fan corresponding to the respective component according to the assigned fan speed offset responsive to a determination that the current temperature is greater than or equal the warning temperature. In one aspect, to determine the type of each respective component of the one or more components 702, the processor 706 may determine whether the respective component is a single point failure component or a vital component.

In one aspect, to set the priority of the respective component, the processor 706 may be configured to set the priority of the respective component to a highest priority responsive to a determination that the respective component is the single point failure component; set the priority of the respective component to a next highest priority responsive to a determination that the respective component is the vital component; and set the priority of the respective component to a lowest priority responsive to a determination that the respective component is not the single point failure component or the vital component.

In one aspect, to assign the fan speed offset, the processor 706 may be configured to assign a highest fan speed offset for operating the at least one fan corresponding to the respective component based on the respective component having the highest priority; assign a next highest fan speed offset, as compared to the highest fan speed offset, for operating the at least one fan corresponding to the respective component based on the respective component having the next highest priority as compared to the highest priority; and assign a lowest fan speed offset for operating the at least one fan corresponding to the respective component based on the respective component having the lowest priority.

The processor 706 may also be configured to: determine (via the one or more component temperature sensors 708), a current temperature of a first component of the one or more components 702; determine a priority of the first component; and operate at least one fan of the one or more fans 710 corresponding to the first component. The processor 706 operates the at least one fan based on at least one of the priority of the first component; a comparison between the current temperature of the first component and a warning temperature of the first component; or a comparison between the current temperature of the first component and a critical temperature of the first component.

In one aspect, to operate the at least one fan, the processor 706 may be configured to increase a fan speed of the at least one fan according to a predetermined fan speed offset corresponding to the priority of the first component responsive to a determination that the priority is less than or equal to 1.

In one aspect, to operate the at least one fan, the processor 706 may be configured to, responsive to a determination that the priority is greater than 1, determine whether the current temperature of the first component is greater than the warning temperature of the first component; determine an absolute value of a difference between the current temperature and the warning temperature responsive to a determination that the current temperature is greater than the warning temperature; and increase a fan speed of the at least one fan according to a lowest fan speed offset responsive to a determination that the absolute value of the difference between the current temperature and the warning temperature is less than or equal to a first preselected tolerance value, e.g., X, where X is an integer representing a lower tolerance value set between the current temperature and the warning temperature.

In one aspect, to operate the at least one fan, the processor 706 may be configured to, responsive to a determination that the priority is greater than 1, determine whether the current temperature of the first component is greater than the warning temperature of the first component; determine an absolute value of a difference between the current temperature and the critical temperature responsive to determination that the current temperature is greater than the warning temperature; and increase the fan speed of the at least one fan according to a lowest fan speed offset responsive to a determination that the absolute value of the difference between the current temperature and the critical temperature is greater than or equal to a second preselected tolerance value, e.g., Y, where Y is an integer representing a lower tolerance value set between the current temperature and the critical temperature.

In one aspect, to operate the at least one fan, the processor 706 may be configured to, responsive to a determination that the priority is greater than 1, increase the fan speed of the at least one fan according to a predetermined fan speed offset corresponding to the priority of the respective component responsive to a determination that: the current temperature is greater than the warning temperature; the absolute value of the difference between the current temperature and the warning temperature is not less than or equal to the first preselected tolerance value (e.g., X); and the absolute value of the difference between the current temperature and the critical temperature is not greater than or equal to the second preselected tolerance value (e.g., Y).

Figure 8:
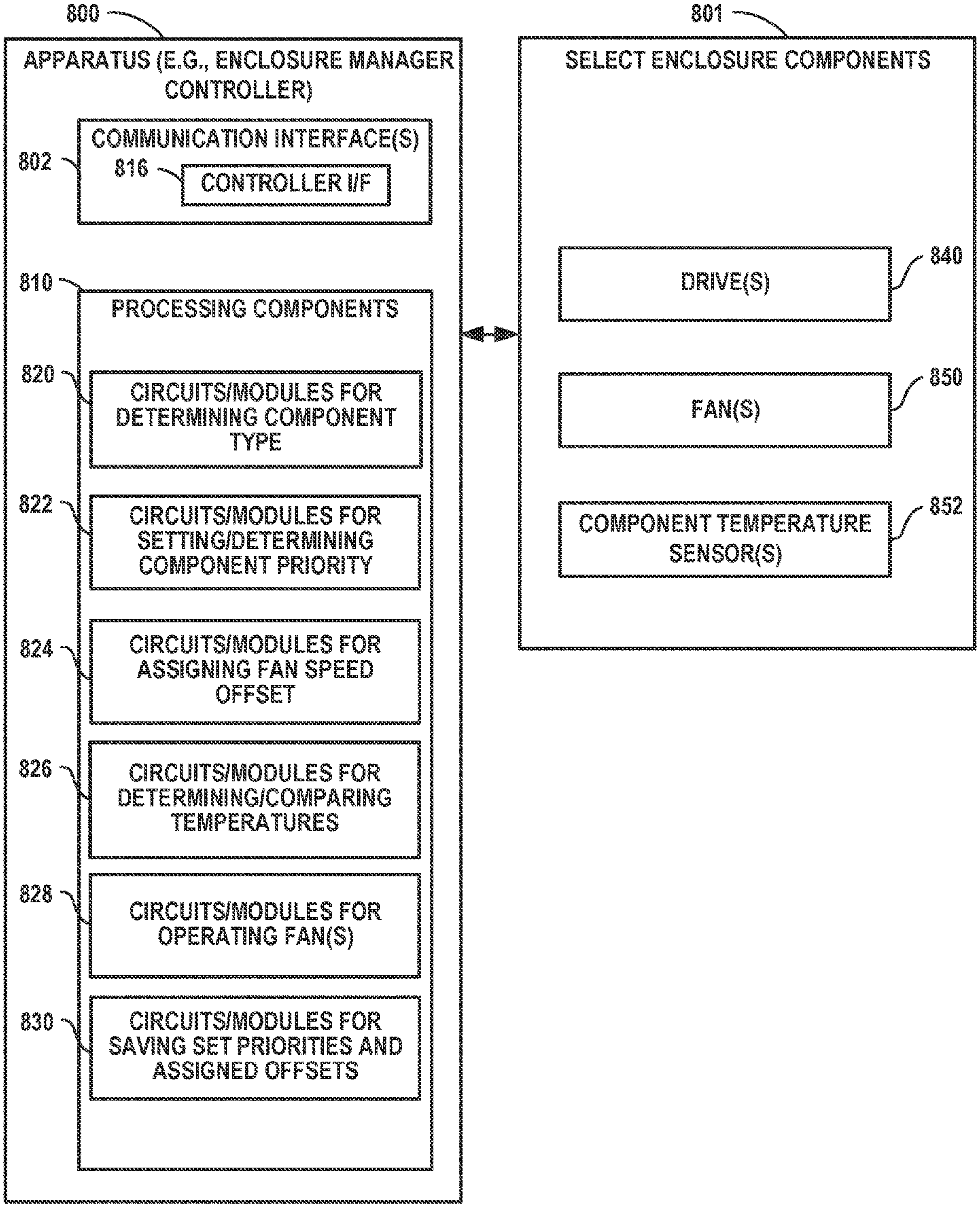
FIG. 8 is a schematic block diagram configuration for an exemplary data storage device enclosure configured in accordance with some aspects of the disclosure.

FIG. 8 illustrates an embodiment of an exemplary data storage device enclosure configured according to one or more aspects of the disclosure. The data storage device enclosure, or components thereof, could embody or be implemented with an apparatus 800. e.g., data storage controller such as a DSD controller or enclosure manager controller coupled to a volatile memory (not shown) and select enclosure components 801 including one or more drives 840, one or more fans 850, and one or more component temperature sensors 852. In various implementations, the apparatus 800, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 800 includes a communication interface 802 and is coupled to the select enclosure components 801. The communication interface 802 is further coupled to the one or more drives 840, the one or more fans 850, and the one or more component temperature sensors 852. These components can be coupled to and/or placed in electrical communication with one another via suitable components, represented generally by the connection line in FIG. 8. Although not shown, other circuits such as timing sources, peripherals, voltage regulators, and power management circuits may be provided, which will not be described any further.

The communication interface 802 of the apparatus 800 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including circuitry for outputting and/or obtaining signals (e.g., outputting signal from and/or receiving signals into a DSD or enclosure manager).

The select enclosure components 801 may include the one or more drives 840 for storing data. The select enclosure components 801 may be accessed by the processing components 810.

In one aspect, the apparatus 800 may also include volatile memory for storing instructions and other information to support the operation of the processing components 810.

The apparatus 800 includes various processing components 810 arranged or configured to obtain, process and/or send data, control data access and storage, issue or respond to commands, and control other desired operations. For example, the processing components 810 may be implemented as one or more processors, one or more controllers, and/or other structures configured to perform functions. According to one or more aspects of the disclosure, the processing components 810 may be adapted to perform any or all of the features, processes, functions, operations and/or routines described herein. For example, the processing components 810 may be configured to perform any of the steps, functions, and/or processes described with respect to FIGS. 1-7. As used herein, the term "adapted" in relation to processing components 810 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-7. The processing components 810 serve as an example of a means for processing. In various implementations, the processing components 810 may provide and/or incorporate, at least in part, functionality described above for the components of controller 108 of FIG. 1, enclosure manager 204 of FIG. 2, or controller 704 of FIG. 7.

According to at least one example of the apparatus 800, the processing components 810 may include one or more of: circuits/modules 820 configured for determining a type of each respective component of one or more components 801: circuits/modules 822 configured for setting a priority of a respective component of the one or more components 801 based on the type of the respective component and determining the priority of the respective component or a first component of the one or more components 801; circuits/modules 824 configured for assigning a fan speed offset for operating at least one fan of one or more fans 850 corresponding to the respective component based on the priority of the respective component; circuits/modules 826 configured for determining (via at least one component temperature sensor 852) whether a current temperature of the respective component is greater than or equal to a warning temperature of the respective component and determining (via the at least one component temperature sensor 852) a current temperature of the first component of the one or more components 801; circuits/modules 828 configured for operating the at least one fan of the one or more fans 850 corresponding to the respective component according to the assigned fan speed offset based on preselected conditions, and operating the at least one fan of the one or more fans 850 corresponding to the first component based on at least one of the priority of the respective component, a comparison between the current temperature of the first component and a warning temperature of the first component, or a comparison between the current temperature of the first component and a critical temperature of the first component; and circuit/modules 830 configured for saving set priorities and assigned fans speed offsets for the one or more components 801 as entries in a priority table.

In at least some examples, means may be provided for performing the functions illustrated in FIG. 8 and/or other functions illustrated or described herein. For example, the means may include one or more of: means, such as circuits/modules 820, for determining a type of each respective component of one or more components 801, means, such as circuits/modules 822, for setting a priority of a respective component of the one or more components 801 based on the type of the respective component and determining the priority of a first component of the one or more components; means, such as circuits/modules 824, for assigning a fan speed offset for operating at least one fan of one or more fans 850 corresponding to the respective component based on the priority of the respective component; means, such as circuits/modules 826, for determining whether a current temperature of the respective component is greater than or equal to a warning temperature of the respective component and determining a current temperature of the first component of the one or more components 801; means, such as circuits/modules 828, for operating the at least one fan of the one or more fans 850 corresponding to the respective component according to the assigned fan speed offset based on preselected conditions, and operating the at least one fan of the one or more fans 850 corresponding to the first component based on at least one of the priority of the first component, a comparison between the current temperature of the first component and a warning temperature of the first component, or a comparison between the current temperature of the first component and a critical temperature of the first component; and means, such as circuits/modules 820, for saving set priorities and assigned fans speed offsets for the one or more components 801 as entries in a priority table.

Additional Aspects

The thermal management techniques for DSD enclosures described herein have a number of advantages related to efficiency and reduced power consumption. At the same time, it is also possible that at least some of the thermal management techniques described herein will decrease the overall reliability of the DSD enclosure as compared to conventional techniques since the enclosure will likely be operating, at least at times, at temperatures higher than would be used for enclosures using the conventional techniques.

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM. EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein.

Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect." or similar language means that a particular feature, structure, or characteristic described in connection with the embodiment is included in at least one embodiment of the present disclosure. Thus, appearances of the phrases "in one embodiment." "in an embodiment," "in one aspect." and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A. B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A. B. and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:

one or more components comprising at least one non-volatile memory (NVM);

at least one component temperature sensor configured to detect one or more component temperatures of the one or more components;

one or more fans configured to reduce the one or more component temperatures of the one or more components; and one or more processors coupled to the one or more components, the at least one component temperature sensor, and the one or more fans, the one or more processors configured, individually or in combination, to:

determine a type of each respective component of the one or more components;

set a priority of a respective component of the one or more components based on the type of the respective component;

assign a fan speed offset for operating at least one fan of the one or more fans corresponding to the respective component based on the priority of the respective component; and operate the at least one fan corresponding to the respective component according to the assigned fan speed offset based on preselected conditions.

2. The data storage device of claim 1, wherein the one or more processors configured, individually or in combination, to operate the at least one fan are further configured, individually or in combination, to:

determine, via the at least one component temperature sensor, whether a current temperature of the respective component is greater than or equal to a warning temperature of the respective component; and wherein the preselected conditions include a determination that the current temperature is greater than or equal to the warning temperature.

3. The data storage device of claim 1, wherein the one or more processors, individually or in combination, configured to determine the type of each respective component of the one or more components are further configured, individually or combination, to:

determine whether the respective component is a single point failure component or a vital component.

4. The data storage device of claim 3, wherein the one or more processors, individually or in combination, configured to set the priority of the respective component are further configured, individually or in combination, to:

set the priority of the respective component to a highest priority responsive to a determination that the respective component is the single point failure component;

set the priority of the respective component to a next highest priority responsive to a determination that the respective component is the vital component; and set the priority of the respective component to a lowest priority responsive to a determination that the respective component is not the single point failure component or the vital component.

5. The data storage device of claim 4, wherein the one or more processors, individually or in combination, configured to assign the fan speed offset are further configured, individually or in combination, to:

assign a highest fan speed offset for operating the at least one fan corresponding to the respective component based on the respective component having the highest priority;

assign a next highest fan speed offset, as compared to the highest fan speed offset, for operating the at least one fan corresponding to the respective component based on the respective component having the next highest priority as compared to the highest priority; and assign a lowest fan speed offset for operating the at least one fan corresponding to the respective component based on the respective component having the lowest priority.

6. The data storage device of claim 1, wherein the one or more components comprises a plurality of solid state devices (SSDs); and wherein the one or more components further comprises at least one of a data storage device (DSD) controller, an input-output module (IOM), an enclosure services module (ESM), a field programmable gate array (FPGA), a baseboard management controller (BMC), a power supply unit (PSU), a switch, or an expander.

7. The data storage device of claim 6, wherein the priority of the one or more components is set such that a priority of the DSD controller is higher than a priority of one of the plurality of SSDs, and the priority of the one SSD is higher than a priority of the IOM.

8. The data storage device of claim 1, wherein a priority of a first type of component of the one or more components is set based on a count of a number of first type components in the data storage device.

9. A method for use with a data storage device including one or more components comprising at least one non-volatile memory (NVM), the method comprising:

determining a type of each respective component of one or more components;

setting a priority of a respective component of the one or more components based on the type of the respective component;

assigning, based on the priority of the respective component, a fan speed offset for operating at least one fan of the data storage device corresponding to the respective component and configured to reduce a component temperature of the respective component; and operating the at least one fan corresponding to the respective component according to the assigned fan speed offset based on preselected conditions.

10. The method of claim 9, wherein the operating the at least one fan comprises:

determining whether a current temperature of the respective component is greater than or equal to a warning temperature of the respective component; and wherein the preselected conditions include a determination that the current temperature is greater than or equal to the warning temperature.

11. The method of claim 9, wherein the determining the type of each respective component of the one or more components comprises determining whether the respective component is a single point failure component or a vital component.

12. The method of claim 11, wherein the setting the priority of the respective component comprises:

setting the priority of the respective component to a highest priority responsive to a determination that the respective component is the single point failure component;

setting the priority of the respective component to a next highest priority responsive to a determination that the respective component is the vital component; and setting the priority of the respective component to a lowest priority responsive to the determination that the respective component is not the single point failure component or the vital component.

13. The method of claim 12, wherein the assigning the fan speed offset comprises:

assigning a highest fan speed offset for operating the at least one fan corresponding to the respective component based on the respective component having the highest priority;

assigning a next highest fan speed offset, as compared to the highest fan speed offset, for operating the at least one fan corresponding to the respective component based on the respective component having the next highest priority as compared to the highest priority; and assigning a lowest fan speed offset for operating the at least one fan corresponding to the respective component based on the respective component having the lowest priority.

14. The method of claim 9, wherein the one or more components comprises a plurality of solid state devices (SSDs); and wherein the one or more components further comprises at least one of a data storage device (DSD) controller, an input-output module (IOM), an enclosure services module (ESM), a field programmable gate array (FPGA), a baseboard management controller (BMC), a power supply unit (PSU), a switch, or an expander.

15. The method of claim 14, wherein the priority of the one or more components is set such that a priority of the DSD controller is higher than a priority of one of the SSDs, and the priority of the one SSD is higher than a priority of the IOM.

16. A data storage device, comprising:

one or more components comprising at least one non-volatile memory (NVM);

at least one component temperature sensor configured to detect one or more component temperatures of the one or more components;

one or more fans configured to reduce the one or more component temperatures of the one or more components; and one or more processors coupled to the one or more components, the at least one component temperature sensor, and the one or more fans, the one or more processors configured, individually or in combination, to:

determine a current temperature of a first component of the one or more components using the at least one component temperature sensor;

determine a priority of the first component;

operate at least one fan of the one or more fans corresponding to the first component based on at least one of:

the priority of the first component;

a comparison between the current temperature of the first component and a warning temperature of the first component; or a comparison between the current temperature of the first component and a critical temperature of the first component; and increase a fan speed of the at least one fan according to a predetermined fan speed offset corresponding to the priority of the first component responsive to a determination that the priority is less than or equal to a preselected priority threshold.

17. The data storage device of claim 16, wherein the preselected priority threshold is 1.

18. The data storage device of claim 16, wherein the one or more processors, individually or in combination, configured to operate the at least one fan are further configured, individually or in combination, to:

responsive to a determination that the priority is greater than 1:

determine whether the current temperature of the first component is greater than the warning temperature of the first component;

determine an absolute value of a difference between the current temperature and the warning temperature responsive to a determination that the current temperature is greater than the warning temperature; and increase the fan speed of the at least one fan according to a lowest fan speed offset responsive to a determination that the absolute value of the difference between the current temperature and the warning temperature is less than or equal to a first preselected tolerance value.

19. The data storage device of claim 18, wherein the one or more processors, individually or in combination, configured to operate the at least one fan are further configured, individually or in combination, to:

responsive to a determination that the priority is greater than 1:

determine an absolute value of a difference between the current temperature and the critical temperature responsive to a determination that the current temperature is greater than the warning temperature; and increase the fan speed of the at least one fan according to the lowest fan speed offset responsive to a determination that the absolute value of the difference between the current temperature and the critical temperature is greater than or equal to a second preselected tolerance value.

20. The data storage device of claim 19, wherein the one or more processors, individually or in combination, configured to operate the at least one fan are further configured, individually or in combination, to:

responsive to a determination that the priority is greater than 1, increase the fan speed of the at least one fan according to the predetermined fan speed offset corresponding to the priority of the first component responsive to a determination that:

the current temperature is greater than the warning temperature;

the absolute value of the difference between the current temperature and the warning temperature is not less than or equal to the first preselected tolerance value; and the absolute value of the difference between the current temperature and the critical temperature is not greater than or equal to the second preselected tolerance value.

* * * * *